July 31, 1951 R. R. WILLIAMS 2,562,654

CIRCUIT FOR COUPLING AN ANTENNA OF A TELEVISION RECEIVER TO A PAIR OF POWER LINE WIRES AND BALANCING OUT UNWANTED SIGNAL REFLECTIONS PRESENT IN THE WIRES

Filed May 27, 1949

INVENTOR.

BY RALPH R. WILLIAMS

McMorrow, Berman + Davidson

ATTORNEYS

Patented July 31, 1951 2,562,654

UNITED STATES PATENT OFFICE 2,562,654

CIRCUIT FOR COUPLING AN ANTENNA OF A TELEVISION RECEIVER TO A PAIR OF POWER LINE WIRES AND BALANCING OUT UNWANTED SIGNAL REFLECTIONS PRESENT IN THE WIRES

Ralph R. Williams, Detroit, Mich.

Application May 27, 1949, Serial No. 95,783

6 Claims. (Cl. 250—16)

This invention relates to radio-receiver antenna systems, and more particularly to an antenna system for use with a television receiver.

A main object of the invention is to provide a novel and improved antenna system for television receivers, said system requiring no outside antenna elements, involving a small number of inexpensive components, and being very easy to install.

A further object of the invention is to provide an improved indoor television antenna system utilizing the inherent ability of the power lines of a building and earth to transmit high frequency currents, having means for balancing the system to minimize the effect of signal reflections, and being easily adjustable to provide maximum efficiency of reception for television signals arriving at the receiver from different directions.

Further objects and advantages of the invention will become apparent from the following description and claims, and from the accompanying drawings, wherein:

Figures 1, 2, 3, 4:
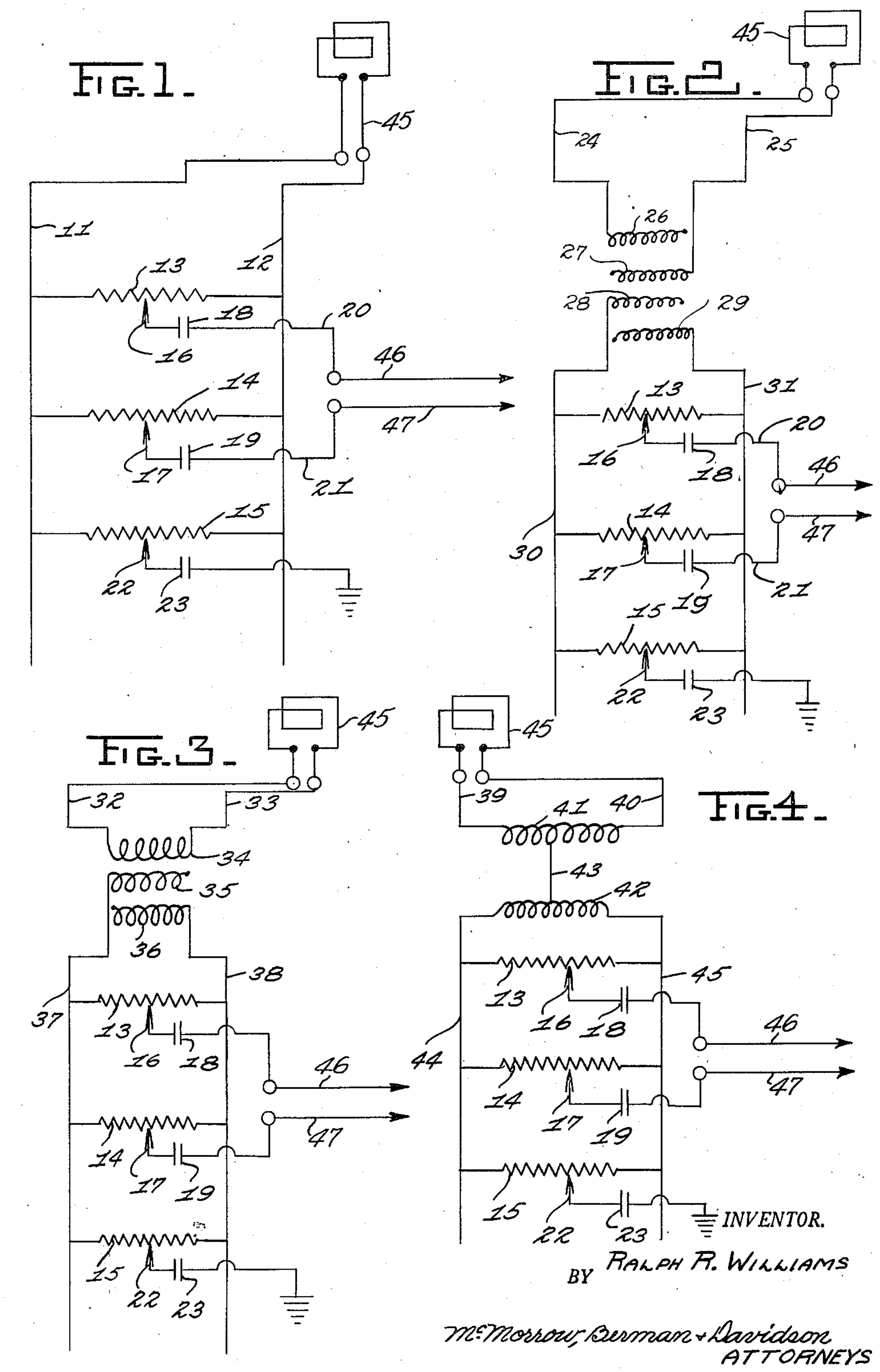
Figure 1 is a schematic wiring diagram of one form of television antenna system constructed in accordance with the present invention.
Figure 2 is a schematic wiring diagram illustrating another form of television antena system according to the present invention.
Figure 3 is a schematic wiring diagram illustrating still another form of television antenna system according to this invention.
Figure 4 is a schematic wiring diagram illustrating a further form of television antenna system according to this invention.

I have found that in many locations within the range of transmission of television transmitting stations, the signal field strength is sufficiently high to provide a usable signal when the electrical power lines of a building and earth are employed as the signal collectors. However, due to the multiple branches connected to ordinary power lines, the presence of numerous metallic objects adjacent the lines, and other sources of mistuning the ordinary television signal available from said power lines and earth is characterized by the presence of a large number of reflections or "ghosts," producing secondary images on the television screen displaced more or less from the main image. The number and strength of the "ghosts" will vary, depending upon local conditions.

I have discovered that it is possible to tune out most of the unwanted reflected signal energy by employing a coupling unit, such as shown in Figure 1, between the signal collector, i. e., the power line wires and earth, and the antenna posts of the receiver. Referring to Figure 1, it will be seen that the lead-in wires 11, 12 constitute part of a circuit means for connection to an antenna 45. Connected across wires 11 and 12 are the end terminals of respective potentiometers 13, 14 and 15, having resistance values of the order of 1000 ohms.

The adjustable taps 16 and 17 of the respective potentiometers 13 and 14 are connected through respective condensers 18 and 19 and connecting wires 20 and 21 to the power lines 46, 47. The adjustable tap 22 of the potentiometer 15 is connected through a condenser 23 to ground. Condensers 18, 19 and 23 are of the order of .00025 mfd. In the arrangement of Figure 1, a substantial number of the "ghosts" may be eliminated or considerably reduced in intensity by adjusting the positions of the respective taps 16, 17 and 22. In many cases it is possible, by adjusting said potentiometers, to blend the "ghosts" into the main image.

In the arrangement of Figure 2, the lead-in wires to the receiver are shown at 24 and 25, the lead-in wires each having one end connected to the antenna 45. Connected to the other end of wire 24 is a coil 26. Connected to the other end of wire 25 is a coil 27. Designated at 28 and 29 are additional coils. The coils 26, 27, 28 and 29 are located close to each other and may be wound on the same coil form, creating a transformer with coils 26 and 27 as the secondary windings and coils 28 and 29 as the primary windings. The lead-in wires 24, 25 and the coils 26 to 29 inclusive constitute a circuit means for connecting the antenna 45 to the receiver not shown. However, each coil has an open end terminal and the coupling between the coils is both capacitive and inductive. While the size and type of coils are optional, I prefer the primary coils to comprise 10 turns and the secondary coils 15 turns of No. 18 wire wound on a ½ inch form with the secondary coils wound over the primary coils. In order to secure a good response curve over all the frequencies of the television channels, I prefer to encase the primary coils with two circular layers of very thin iron tubing, which may be made with iron powder, one on the inside and the other on the outside circumferences of the primary coils. The primary coils are wound meshed together as one winding and the secondary coils are wound meshed together as one winding. Connected to one terminal of coil 28 is a wire 30 and connected to one terminal of coil 29 is a wire 31. Connected across the wires 30 and 31 are the potentiometers 13, 14 and 15, whose taps 16, 17 and 22 are connected respectively through condensers 18, 19 and 23 to the power line wires 46 and 47 and to ground in the same manner as in Figure 1. Operation of the circuit of Figure 2 is substantially the same as that of Figure 1.

In the embodiment of Figure 3, the lead-in wires to the antenna 45 of the receiver are shown at 32 and 33. Wires 32 and 33 are connected to the terminals of a coil 34, which may be of the order of 10 turns of No. 18 wire wound on a ¼ inch form. Disposed adjacent coil 34 or wound on the same form therewith are additional coils 35 and 36. Coils 35 and 36 are in coupling relation to coil 34. Connected to one terminal of coil 35 is a wire 37. Connected to one terminal of coil 36 is a wire 38. Connected across wires 37 and 38 are the potentiometers 13, 14 and 15. The taps of said potentiometers are connected in the same manner as in Figures 1 and 2. The coils of Figure 3 may be constructed similarly to the coils of Figure 2.

In the embodiment of Figure 4, the antenna lead-in wires to the receiver antenna 45 are shown at 39 and 40. Connected across wires 39 and 40 is the coil 41. Coupled to coil 41 is the coil 42. The center turns of coils 41 and 42 are connected by a wire 43. Connected to the terminals of coil 42 are the wires 44 and 45. Connected across wires 44 and 45 are the potentiometers 13, 14 and 15 whose movable taps are connected in the same manner as in Figures 1, 2 and 3.

Operation of the embodiments of the invention shown in Figures 3 and 4 is the same as that of Figures 1 and 2.

The system disclosed herein may be used either alone, or in conjunction with existing antenna systems to improve the operation of the existing systems.

While certain specific embodiments of television antenna control systems utilizing power lines for signal collectors have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. Means for coupling an antenna of a television receiver to a pair of power line wires and for balancing out unwanted signal reflections present in the latter comprising circuit means including lead-in wires adapted to be connected to said antenna and to said television receiver, three potentiometers connected in parallel across said lead-in wires, means coupling the movable tap of one of said potentiometers to one power line wire, means coupling the movable tap of the second potentiometer to the other power line wire, and means coupling the movable tap of the last potentiometer to ground, whereby unwanted signal reflections may be balanced out by adjusting said movable taps.

2. Means for coupling the antenna signal input terminals of a television receiver to the power line wires and for balancing out unwanted signal reflections, comprising circuit means connected to said signal input terminals, said circuit means comprising a plurality of inductors in coupling relation to each other, means connecting respective terminals of certain of said inductors to said signal input terminals, a pair of conductors connected to respective terminals of the remaining inductors, three potentiometers connected in parallel across said conductors, means coupling the movable tap of one of said potentiometers to one power line wire, means coupling the movable tap of the second potentiometer to the other power line wire, and means coupling the movable tap of the last potentiometer to ground, unwanted signal reflections being balanced out by adjusting said movable taps.

3. Means for coupling the antenna signal input terminals of a television receiver to the power line wires and for balancing out unwanted signal reflections, comprising circuit means connected to said signal input terminals, said circuit means comprising a first inductor connected across said signal input terminals, additional inductor means in coupling relation to said first inductor, a pair of conductors connected to respective terminals of said additional inductor means, three potentiometers connected in parallel across said conductors, means coupling the movable tap of one of said potentiometers to one power line wire, means coupling the movable tap of the second potentiometer to the other power line wire, and means coupling the movable tap of the last potentiometer to ground, unwanted signal reflections being balanced out by adjusting said movable taps.

4. Means for coupling the antenna signal input terminals of a television receiver to the power line wires and for balancing out unwanted signal reflections, comprising circuit means connected to said signal input terminals, said circuit means comprising respective inductors each having a terminal connected to a signal input terminal, and a pair of additional inductors, all of said inductors being in coupling relation to each other, a pair of conductors connected to respective terminals of said additional inductors, three potentiometers connected in parallel across said conductors, means coupling the movable tap of one of said potentiometers to one power line wire, means coupling the movable tap of the second potentiometer to the other power line wire, and means coupling the movable tap of the last potentiometer to ground, unwanted signal reflections being balanced out by adjusting said movable taps.

5. Means for coupling the antenna signal input terminals of a television receiver to the power line wires and for balancing out unwanted signal reflections, comprising circuit means connected to said signal input terminals, said circuit means comprising a pair of inductors in coupling relation to each other, one of the inductors being connected to the signal input terminals, a pair of conductors connected to the terminals of the other inductor, means connecting the center turns of the inductors together, three potentiometers connected in parallel across said conductors, means coupling the movable tap of one of said potentiometers to one power line wire, means coupling the movable tap of the second potentiometer to the other power line wire, and means coupling the movable tap of the last potentiometer to ground, unwanted signal reflections being balanced out by adjusting said movable taps.

6. Means for coupling an antenna of a television receiver to a pair of power line wires and for balancing out unwanted signal reflections present in the latter comprising circuit means including lead-in wires adapted to be connected to said antenna and to said television receiver, three potentiometers connected in parallel across said lead-in wires, means including a condenser coupling the movable tap of one of said potentiometers to one of said pair of power lines, means including a condenser coupling the movable tap of the second of said potentiometers to the other of said pair of power lines, and means including a condenser coupling the movable tap of the last potentiometer to ground, whereby unwanted signal reflections may be balanced out by adjusting said movable taps .

RALPH R. WILLIAMS.

REFERENCES CITED

The following references are of record in the file of this patent:

UNITED STATES PATENTS

| Number | Name | Date |
|---|---|---|
| 1,922,335 | Sobocinski | Aug. 15, 1933 |
| 1,995,731 | Amy et al. | Mar. 26, 1935 |